(12) United States Patent
Yamashima et al.

(10) Patent No.: US 11,437,654 B2
(45) Date of Patent: Sep. 6, 2022

(54) BATTERY PACK

(71) Applicant: TDK CORPORATION, Tokyo (JP)

(72) Inventors: Masayuki Yamashima, Tokyo (JP); Mikio Tsuruoka, Tokyo (JP); Hiroki Kitamura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 476 days.

(21) Appl. No.: 16/604,193

(22) PCT Filed: Nov. 20, 2018

(86) PCT No.: PCT/JP2018/042798
§ 371 (c)(1),
(2) Date: Oct. 10, 2019

(87) PCT Pub. No.: WO2019/102986
PCT Pub. Date: May 31, 2019

(65) Prior Publication Data
US 2020/0067145 A1 Feb. 27, 2020

(30) Foreign Application Priority Data

Nov. 22, 2017 (JP) .............................. JP2017-225044

(51) Int. Cl.
*H01M 10/44* (2006.01)
*H01M 10/46* (2006.01)
(Continued)

(52) U.S. Cl.
CPC ... *H01M 10/4228* (2013.01); *H01M 10/0568* (2013.01); *H01M 10/0569* (2013.01);
(Continued)

(58) Field of Classification Search
CPC .......................... H01M 10/4228; H02J 7/0021
(Continued)

(56) References Cited

U.S. PATENT DOCUMENTS 5,824,883 A 10/1998 Park et al.
6,337,559 B1 1/2002 Sato
(Continued)

FOREIGN PATENT DOCUMENTS

EP 1083619 A2 3/2001
JP S63-49761 U 4/1988
(Continued)

OTHER PUBLICATIONS

Jul. 29, 2021 Search Report issued in European Patent Application No. 18880801.8.
(Continued)

*Primary Examiner* — Suchin Parihar
(74) *Attorney, Agent, or Firm* — Oliff PLC

(57) ABSTRACT

A battery pack which includes: a battery cell which contains a non-aqueous electrolyte, wherein the battery cell is a non-aqueous electrolyte secondary battery; a casing which stores the battery cell; and at least one liquid leakage sensor which detects liquid leakage from the battery cell, wherein the casing and/or the battery cell have a leaked liquid retention region in which the non-aqueous electrolyte tends to be retained when the non-aqueous electrolyte leaks out of the battery cell, wherein the liquid leakage sensor outputs measurement information as a detection result without using a charging/discharging circuit which charges and discharges the battery cell, and wherein at least one sensor unit of the liquid leakage sensor is provided in the leaked liquid retention region.

20 Claims, 7 Drawing Sheets

(51) Int. Cl.
 *H02J 7/00* (2006.01)
 *H01M 10/42* (2006.01)
 *H01M 10/0568* (2010.01)
 *H01M 10/0569* (2010.01)

(52) U.S. Cl.
 CPC .......... *H01M 10/44* (2013.01); *H01M 10/46* (2013.01); *H02J 7/0021* (2013.01); *H01M 2300/0025* (2013.01)

(58) Field of Classification Search
 USPC ........................................................ 320/134
 See application file for complete search history.

(56) References Cited

U.S. PATENT DOCUMENTS

| | | | |
|---|---|---|---|
| 2006/0134511 A1 | 6/2006 | Ito et al. | |
| 2007/0190403 A1* | 8/2007 | Wang | H01M 10/484 |
| | | | 429/63 |
| 2011/0250477 A1 | 10/2011 | Yoshida et al. | |
| 2013/0181826 A1* | 7/2013 | Yang | H01M 10/484 |
| | | | 340/455 |
| 2014/0020763 A1* | 1/2014 | Phlegm | G01M 3/16 |
| | | | 137/467.5 |
| 2014/0210603 A1* | 7/2014 | Walser | G01R 27/02 |
| | | | 324/691 |
| 2018/0175429 A1* | 6/2018 | Gottlieb | H01M 8/2484 |

FOREIGN PATENT DOCUMENTS

| | | |
|---|---|---|
| JP | 2001-084996 A | 3/2001 |
| JP | 2005-293881 A | 10/2005 |
| JP | 2009-032550 A | 2/2009 |
| JP | 2009-284687 A | 12/2009 |
| JP | 2010-153117 A | 7/2010 |
| JP | 2012-226866 A | 11/2012 |
| JP | 2016-001525 A | 1/2016 |
| JP | 2016-134259 A | 7/2016 |

OTHER PUBLICATIONS

Sep. 10, 2021 Office Action issued in Chinese Patent Application No. 201880024219.1.
Jan. 15, 2019 International Search Report issued in International Patent Application No. PCT/JP2018/042798.
Jan. 6, 2022 Office Action issued in Chinese Patent Application No. 201880024219.1.
Feb. 15, 2022 Translation of Office Action in Japanese Application No. 2019-555306.
Feb. 21, 2022 Result of Consultation in EP Application No. 18880801.8.

\* cited by examiner

BATTERY PACK

TECHNICAL FIELD

The present invention relates to a battery pack.

Priority is claimed on Japanese Patent Application No. 2017-225044, filed on Nov. 22, 2017, the content of which is incorporated herein by reference.

BACKGROUND ART

As an example of a non-aqueous electrolyte secondary battery, there is a lithium ion secondary battery. The lithium ion secondary battery is lightweight, has a large capacity, and is widely used as, for example, a power source for a portable electronic apparatus. The non-aqueous electrolyte secondary battery is coupled to a control circuit, and thus configures a battery pack. The battery pack includes one or more battery cells formed of the non-aqueous electrolyte secondary battery, and the control circuit.

The battery cell is coated with an outer package. In a case where the battery cell is subjected to an impact or the battery cell deteriorates, a crack or the like may be generated in the outer package, and thus a non-aqueous electrolyte may leak out of the battery cell. When the non-aqueous electrolyte leaks, charging and discharging of the battery cannot be effectively carried out.

For example, Patent Documents 1 and 2 disclose a liquid leakage sensor and a liquid leakage detection system which are used in a battery pack including a lead storage battery as a battery cell. For example, Patent Document 3 discloses a battery pack that can detect liquid leakage of a lithium ion secondary battery.

CITATION LIST

Patent Document

Patent Document 1: Japanese Unexamined Patent Application, First Publication No. 2016-1525

Patent Document 2: Japanese Unexamined Patent Application, First Publication No. 2005-293881

Patent Document 3: Japanese Unexamined Patent Application, First Publication No. 2001-84996

DISCLOSURE OF INVENTION

Technical Problem

In the liquid leakage detection system disclosed in Patent Document 1 and Patent Document 2, a battery forming the battery cell is the lead storage battery which uses an aqueous electrolyte which contains water as a solvent. When the conductive aqueous electrolyte causes electrodes of the sensor to be short-circuited, and liquid leakage is detected by the system. In contrast, an electrolyte of a non-aqueous system is not conductive. In a case where such an electrolyte leaks and comes into contact with electrodes, the sensor cannot detect a sufficient resistance value change (impedance change).

In the battery pack disclosed in Patent Document 3, a liquid leakage detector is directly coupled to a battery cell. In a case of the configuration, a case where a resistance value (impedance) between electrodes of a sensor changes due to liquid leakage cannot be differentiated from a case where the battery cell deteriorates due to overcharging or the like, and thus a resistance value (impedance) changes. There is a case where droplets caused by condensation or the like are attached to the sensor, and thus an incorrect operation is performed according to misrecognition that liquid leakage has occurred.

The present invention has been made in light of the problems above, and an object thereof is to provide a battery pack capable of detecting leakage of an electrolyte.

Solution to Problem

The inventors found that, when a liquid leakage sensor is provided separately from a battery cell and a change between electrodes of the sensor which is caused by a leaked electrolyte is read, it is possible to increase liquid leakage detection sensitivity and to prevent misrecognition caused by other factors. In other words, in order to solve the problem, the following means is provided.

(1) A battery pack according to a first aspect includes a battery cell which contains a non-aqueous electrolyte, wherein the battery cell is a non-aqueous electrolyte secondary battery;
 a casing which stores the battery cell; and
 at least one liquid leakage sensor which detects liquid leakage from the battery cell,
  wherein one or both of the casing and the battery cell have a leaked liquid retention region in which the non-aqueous electrolyte tends to be retained when the non-aqueous electrolyte leaks out of the battery cell,
  wherein the liquid leakage sensor outputs measurement information as a detection result without using a charging/discharging circuit which charges and discharges the battery cell, and
  wherein at least one sensor unit of the liquid leakage sensor is provided in the leaked liquid retention region.

The first aspect preferably includes the following features. The following features are preferably combined with each other.

(2) In the battery pack according to the aspect, the liquid leakage sensor may detect an impedance change caused by attachment of the non-aqueous electrolyte to the sensor unit.

(3) In the battery pack according to the aspect, the liquid leakage sensor may include a liquid leakage determination unit which determines whether or not liquid leakage occurs on the basis of a tendency of the impedance change.

(4) In the battery pack according to the aspect, the sensor unit may contain at least one metal selected from the group consisting of tin, silver, copper, nickel, zinc, and lead.

(5) The battery pack according to the aspect may further include a second sensor which detects a voltage or current change of the battery cell.

(6) In the battery pack according to the aspect, the non-aqueous electrolyte may contain an organic carbonate solvent.

(7) In the battery pack according to the aspect, the non-aqueous electrolyte may contain a lithium salt including a fluorine atom.

(8) In the battery pack according to the aspect, the non-aqueous electrolyte second battery may be a lithium ion secondary battery.

(9) In the battery pack according to the aspect, the sensor unit may include at least a first electrode and a second electrode which is insulated and disposed with a predetermined gap from the first electrode.

(10) In the battery pack according to the aspect, the liquid leakage sensor may include the sensor unit, a wiring portion extending from the sensor unit, and a liquid leakage determination unit coupled to the wiring portion, and the wiring portion is not preferably coupled to the charging/discharging circuit of the battery cell.

(11) The battery pack according to the aspect may further include the charging/discharging circuit, and a part of the charging/discharging circuit may be included in the casing, and a remaining portion of the charging/discharging circuit may be provided outside the casing.

(12) In the battery pack according to the aspect, the part of the charging/discharging circuit included in the casing is not preferably coupled to the liquid leakage sensor in the casing.

(13) In the battery pack according to the aspect, the liquid leakage sensor may be disposed inside the casing.

(14) In the battery pack according to the aspect, the liquid leakage sensor may be disposed outside the casing.

Advantageous Effects of Invention

The battery pack according to the aspect can detect leakage of an electrolyte.

BEST MODE FOR CARRYING OUT THE INVENTION

Hereinafter, the present embodiment will be described in detail with reference to the drawings as appropriate. The drawings in the following description may illustrate a feature portion to be enlarged for convenience for better understanding of the features of the present invention, and a dimension and/or a scale of each constituent element may or may not be the same as actual one. A material, a dimension, the number, a position, or the like exemplified in the following description is only an example, and is not limited thereto. Appropriate modifications such as omissions, additions, and changes may occur within the scope without departing from the concept of the present invention.

[Battery Pack]

Figure 1:
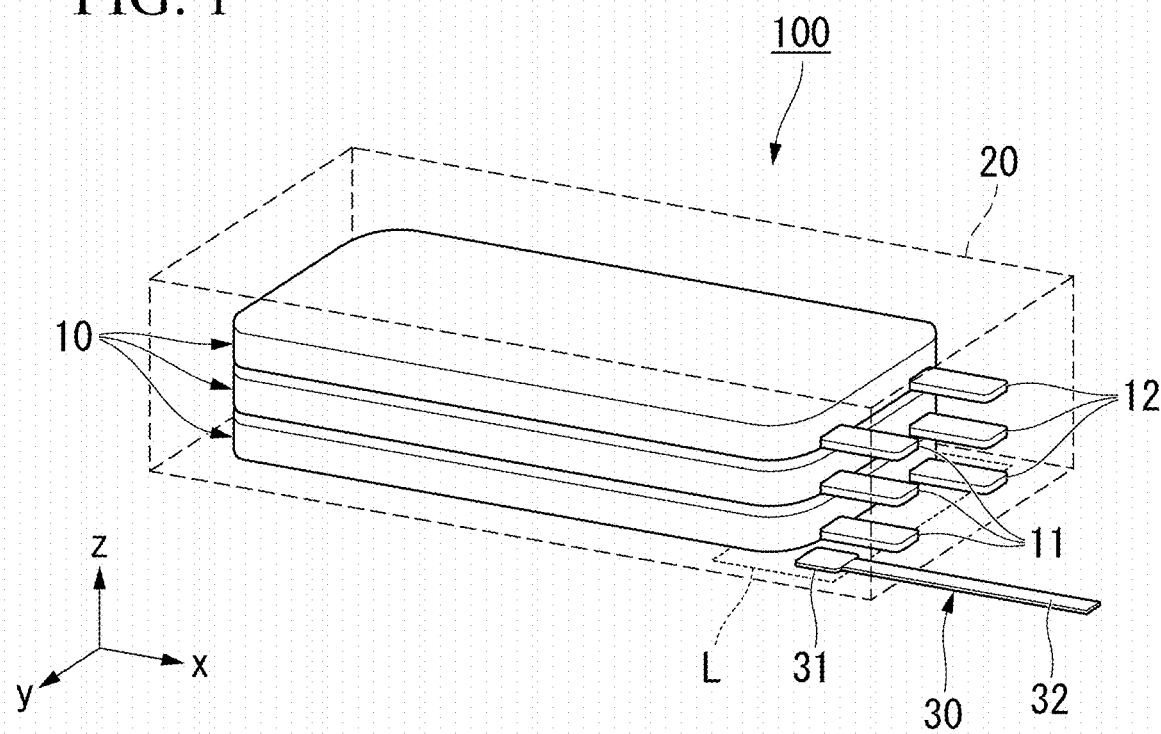
FIG. 1 is a schematic perspective view illustrating a preferable example of a battery pack according to the present embodiment.

FIG. 1 is a schematic perspective view illustrating a preferable example of a battery pack according to the present embodiment. As illustrated in FIG. 1, a battery pack 100 according to the present embodiment includes battery cells 10, a casing 20, and a liquid leakage sensor 30. In FIG. 1, the casing 20 is illustrated by a dotted line for illustration of an internal structure.

(Battery Cell)

The battery cell 10 is configured with a non-aqueous electrolyte secondary battery. The non-aqueous electrolyte secondary battery is preferably a lithium ion secondary battery having a lithium ion as a carrier. The battery cell 10 includes a cathode, an anode, a separator, and an outer package. The cathode and the anode are disposed to oppose each other with the separator interposed therebetween. The outer package coats the cathode, the anode, and the separator except a cathode terminal 11 coupled to the cathode and an anode terminal 12 coupled to the anode. A shape of the battery cell 10 is a substantially rectangular shape, and is not limited to this example. The battery cells may be coupled in series to each other and may be coupled in parallel to each other as necessary.

The cathode is preferably a plate-like (film-like) cathode collector provided with a cathode active material layer. The anode is preferably a plate-like (film-like) anode collector provided with an anode active material layer. The cathode active material layer and the anode active material layer are impregnated with an electrolyte. Ions are sent and received between the cathode and the anode via the electrolyte.

As the electrolyte, an electrolyte of a non-aqueous type (hereinafter, referred to as a non-aqueous electrolyte) is used. In the non-aqueous electrolyte, an electrolyte is dissolved in a non-aqueous solvent. Non-aqueous solvent can be optionally selected, and an organic carbonate solvent is preferably used. As the organic carbonate solvent, at least one of a cyclic carbonate and a chain carbonate is preferably used. Only one of the cyclic carbonate and the chain carbonate may be used, and a mixture thereof may be used.

As the cyclic carbonate, a carbonate that can solvate an electrolyte may be used. For example, an ethylene carbonate, a propylene carbonate, or a butylene carbonate may be preferably used. The carbonates may be used alone or may be used in combination of two or more.

The chain carbonate can reduce viscosity of a cyclic carbonate. For example, diethyl carbonate, dimethyl carbonate, or ethyl methyl carbonate may be preferably used. The carbonates may be used alone or may be used in combination of two or more. The organic carbonate solvent may be mixed with other components such as methyl acetate, ethyl acetate, methyl propionate, ethyl propionate, γ-butyrolactone, 1,2-dimethoxyethane, and 1,2-diethoxyethane.

Electrolyte to be contained in an electrolyte can be optionally selected. For example, metal salts such as lithium salts and magnesium salts may be preferably used. The electrolyte is particularly preferably a metal salt including a fluorine atom, such as lithium hexafluorophosphate ($LiPF_6$) or lithium tetrafluoroborate ($LiBF_4$).

(Casing)

The casing 20 stores the battery cells 10. In the example of the casing 20 illustrated in FIG. 1, three stacked battery cells 10 are stored. The number of battery cells 10 stored in the casing 20 is not limited to this case, and the number may be one, two, or four or more. The casing 20 may have a rectangular shape, but may have other shapes as necessary. The battery cells 10 may be disposed to be stacked in contact with each other in the casing 20. Alternatively, the battery cells 10 may be stacked on each other with gaps and/or via other members. The casing 20 and the battery cells 10 may be in direct contact with each other, and may not be in direct contact with each other with another member interposed therebetween.

A material forming the casing 20 may be selected as necessary and thus is not particularly limited, but preferably has insulation. It is possible to prevent a current from flowing via the casing 20.

One or both of the casing 20 or the battery cell 10 have a leaked liquid retention region L. The number of leaked liquid retention region L may be one or more, and any number thereof may be selected. The leaked liquid retention region L is preferably disposed on surfaces (surface) of the casing 20 and/or the battery cell 10. The leaked liquid retention region L is a portion where a non-aqueous electrolyte can be easily retained when the non-aqueous electrolyte leaks out of the battery cell 10. In a case where there are two or more locations where a leaked liquid is easily retained, two or more leaked liquid retention regions L may be provided. For example, a non-aqueous electrolyte is easily collected on a lower surface of the battery cell 10 and a bottom surface of the casing 20 due to the gravity. The periphery of the cathode terminal 11 and the anode terminal 12 of the battery cell 10 has weak contact with the outer package, and thus liquid leakage tends to occur thereon. Thus, such a portion may be considered as the leaked liquid retention region L. In a case where the battery pack 100 is mounted in a state in which a side surface of the battery cell is directed downward, a side surface of the battery pack 100 located downward when mounted may be considered as the leaked liquid retention region L. In a case where the battery cell is expected to be moved or rotated, the leaked liquid retention region L may be provided at a plurality of positions selected as necessary.

As a specific example of a position of the region L, in a case where battery cells 10 are sequentially stacked, the leaked liquid retention region L may be disposed in a region overlapping at least one of the cathode terminal 11 and the anode terminal 12 in a plan view, and/or may be disposed between the cathode terminal 11 and the anode terminal 12 in a plan view. The region may be the entire bottom surface of the casing or may be a part of the bottom surface located inside the casing 20, and/or may be the entire bottom surface of the casing or may be a part of the bottom surface located outside the casing 20. As other specific examples, in a case where the battery cells 10 are stacked, the leaked liquid retention region L may be provided on a surface of the battery cell 10 which is disposed at closest to the casing in a plan view, for example, may be provided on a surface on the bottom surface side of the battery cell 10 disposed at the lowest position. In a case where the bottom surface of the casing or the battery cell has a rectangular shape or a substantially rectangular shape having long sides and short sides, the shortest distance from the short side of the bottom surface which is located on the cathode terminal 11 and the anode terminal 12 sides to each side of the leaked liquid retention region L is, for example, preferably 1/2 or less of a length of the long side, more preferably 1/3 or less, most preferably 1/4 or less, and particularly preferably 1/6 or less. Area of the leaked liquid retention region L may be optionally selected. For example, a ratio of the area of the leaked liquid retention region L to areas (area) of the surfaces (surface) of the casing and/or the battery cell, for example, an area of a surface on which the region L is disposed may be 1/50 or more, may be 1/30 or more, and may be 1/20 or more. The ratio may be 1/1 or less, may be 1/3 or less, may be 1/5 or less, and may be 1/10 or less.

A shape of the leaked liquid retention region L in the present embodiment is a rectangular shape or a substantially rectangular shape having a long side and a short side. However, a shape of the leaked liquid retention region L is not limited to this example. A shape of the leaked liquid retention region L may be similar to the shape of the bottom surface of the casing, and the size of such a region L may be or may not be the same with that of the bottom surface of the casing. The leaked liquid retention region L may be disposed at a position where one of the long sides of the region L is closest to at least one of the short sides of the casing.

At least a sensor unit 31 of the liquid leakage sensor 30 is disposed in the leaked liquid retention region L. The number of liquid leakage sensors 30 and the number of sensor units 31 included in the battery pack can be optionally selected. For example, the number may be one to ten, may be one to six, and may be one or two. When the battery pack 100 is mounted on a device or a member which uses the battery pack, the installation location and the number of liquid leakage sensors 30 can be optionally selected according to the device or the member. As a specific example, in a case where the device or the member is supposed not to be transferred after the battery pack is mounted, the number of sensor units 31 may be small, and, for example, one or about two to four sensor units 31 may be disposed at positions where a non-aqueous electrolyte is easily gathered. On the other hand, in a case where the device or the member is supposed to be transferred or rotated after the battery pack is mounted, one or more sensor units 31 may be provided at other positions in addition to positions where a non-aqueous electrolyte is easily gathered due to the gravity.

(Liquid Leakage Sensor)

The liquid leakage sensor 30 detects liquid leakage from the battery cell 10. The liquid leakage sensor 30 preferably includes the sensor unit 31 and a wiring portion 32 extending from the sensor unit 31.

Figure 2:
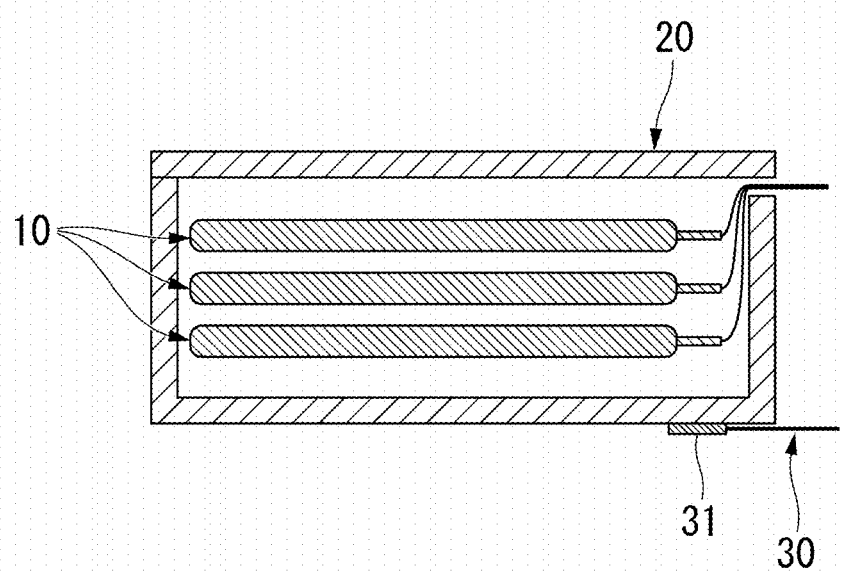
FIG. 2 is a schematic sectional view illustrating another preferable example of the battery pack according to the present embodiment.
Figure 3:
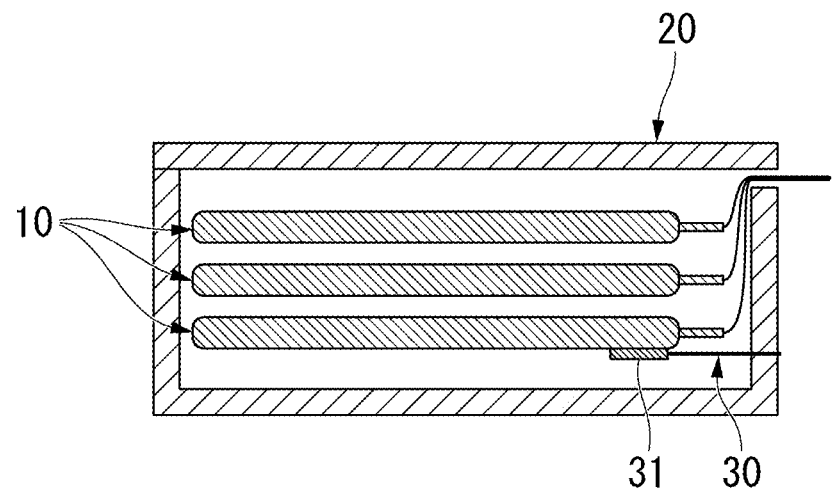
FIG. 3 is a schematic sectional view illustrating still another preferable example of the battery pack according to the present embodiment.

The sensor unit 31 is provided in the leaked liquid retention region L. The sensor unit 31 illustrated in FIG. 1 is disposed on the bottom surface inside the casing 20 around the cathode terminal 11 and the anode terminal 12. An installation position of the sensor unit 31 is not limited to the position, and may be disposed on the bottom surface outside the casing 20 as illustrated in FIG. 2, and may be disposed on the lower surface of the battery cell 10 as illustrated in FIG. 3. Positions of the wiring portion 32 and a liquid leakage determination unit 33 coupled to the wiring portion 32 may be set to any selected locations inside or outside the casing. A single liquid leakage determination unit may be coupled to a plurality of sensor units.

The liquid leakage sensor 30 is independent from the battery cell 10. Here, the independence from the battery cell 10 indicates that the liquid leakage sensor 30 is independent from a circuit operating the battery cell 10. In other words, wirings extending from the cathode terminal 11 and the anode terminal 12 of the battery cell 10 are not directly coupled to the wiring portion 32 of the liquid leakage sensor 30. The liquid leakage sensor 30 may output detected measurement information without using a charging/discharging circuit of the battery cell 10.

The charging/discharging circuit of the battery pack may be a circuit located over both of the inside and the outside of the casing which stores the battery cells. The liquid leakage sensor 30 is not coupled to a portion of the charging/discharging circuit which is included in the casing. Measurement information detected by the liquid leakage sensor 30 may be sent to an output destination located outside the casing via a wiring that does not influence charging and discharging of the battery cell 10. The output destination may be disposed at the other portion of the charging/discharging circuit located outside the casing.

Figure 4:
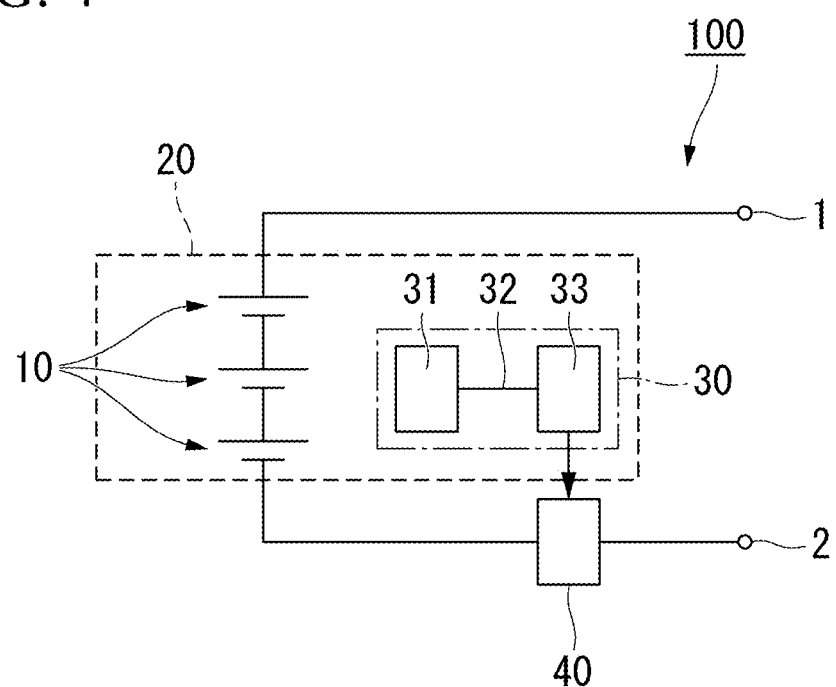
FIG. 4 is a diagram schematically illustrating a preferable example of a circuit structure of the battery pack according to the present embodiment.

FIG. 4 is a diagram schematically illustrating a circuit structure of the battery pack 100 according to the present embodiment. As illustrated in FIG. 4, the battery cells 10 arranged in series are coupled to a first terminal 1 and a second terminal 2. The first terminal 1 and the second terminal 2 are coupled to a main device or a charger. A charging control unit 40 is disposed between the first terminal 1 and the second terminal 2.

In the electric leakage sensor 30, the wiring portion 32 extending from the sensor unit 31 is coupled to the liquid leakage determination unit 33. In a case where liquid leakage is determined by the liquid leakage determination unit 33, information regarding the liquid leakage is sent to the charging control unit 40, and at least charging of the battery cells 10 is stopped. A wiring between the liquid leakage determination unit 33 and the charging control unit 40 is a wiring via which information is delivered between circuits. A circuit charging and discharging the battery cells 10 is differentiated from a circuit operating the liquid leakage sensor 30 by the wiring. The wiring is used to deliver information, and thus does not influence impedance of the battery cell 10. In other words, the circuits are separated from each other, and are thus differentiated from each other. The circuits are differentiated from each other, and thus it is possible to prevent the impedance of the liquid leakage sensor 30 from being influenced by deterioration or the like in the battery cell 10.

Figure 5:
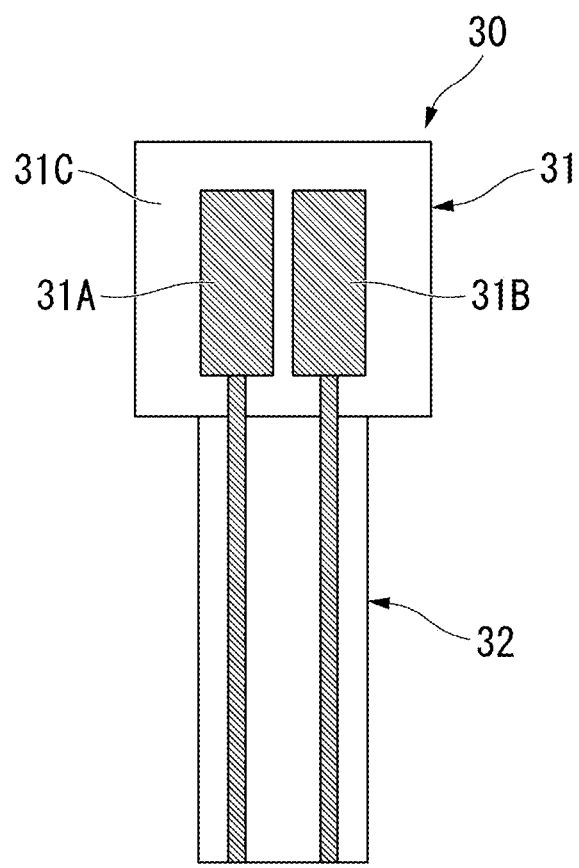
FIG. 5 is a plan view illustrating a preferable example of a liquid leakage sensor of the battery pack according to the present embodiment.

The liquid leakage sensor 30 detects a predetermined impedance change caused by attachment of a non-aqueous electrolyte to the sensor unit 31. FIG. 5 is a plan view illustrating the liquid leakage sensor 30 of the battery pack according to the present embodiment. The sensor unit 31 illustrated in FIG. 5 includes a first electrode 31A and a second electrode 31B. The first electrode 31A and the second electrode 31B are formed on an insulating substrate 31C. The first electrode 31A and the second electrode 31B are disposed to be separated from each other on the substrate 31C and are thus insulated from each other.

Figure 6:
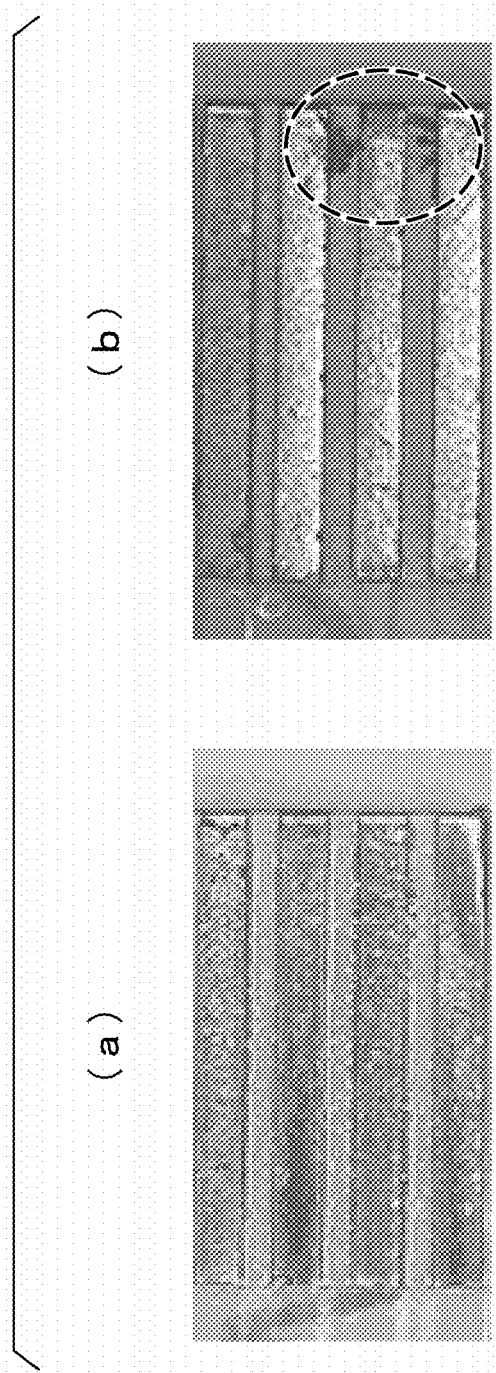
FIG. 6 illustrates pictures of the enlarged periphery of electrodes before and after a non-aqueous electrolyte is attached to a sensor unit of the battery pack of the preferable example according to the present embodiment.

In a case where a non-aqueous electrolyte is attached to the sensor unit 31, the non-aqueous electrolyte reacts with the first electrode 31A and the second electrode 31B, and thus metal is deposited from the first electrode 31A and the second electrode 31B. FIG. 6 is a schematic diagram illustrating the enlarged periphery of the electrodes of the sensor unit 31. (a) of FIG. 6 is a picture before a non-aqueous electrolyte comes into contact with the electrodes, and (b) of FIG. 6 is a picture after the non-aqueous electrolyte comes into contact with the electrodes. As illustrated in (b) of FIG. 6, whiskers grow from the electrodes after contact with the non-aqueous electrolyte.

A cause of the metal deposition is not obvious, but the metal deposition may occur as a result of the first electrode 31A and the second electrode 31B being corroded by the non-aqueous electrolyte. In a case where metal is deposited between the facing first electrode 31A and second electrode 31B, impedance between the first electrode 31A and the second electrode 31B changes, and a voltage changes due to the impedance change in the present embodiment.

Figure 7:
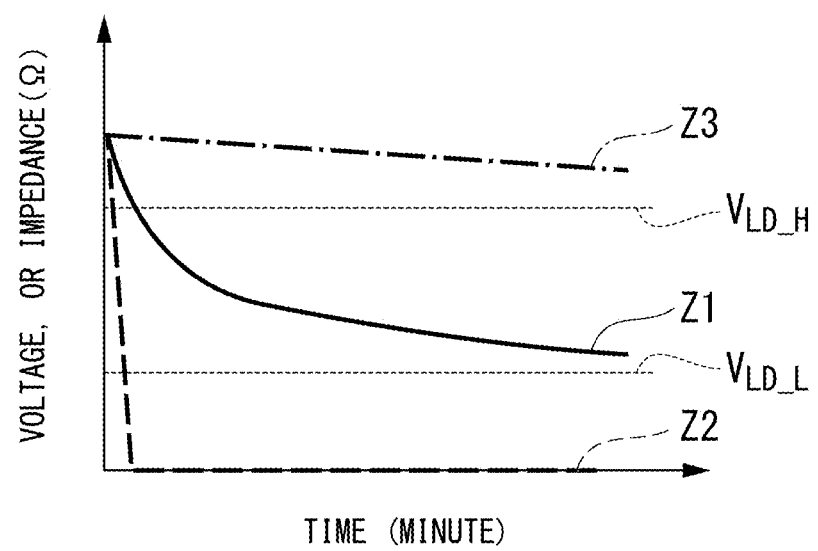
FIG. 7 is a diagram schematically illustrating an example of a temporal change of impedance between a first electrode and a second electrode.

FIG. 7 is a diagram schematically illustrating a temporal change of impedance between the first electrode 31A and the second electrode 31B, that is, a temporal change of a voltage. In FIG. 7, a first curve Z1 indicates a predetermined impedance change (that is, a voltage change) caused by attachment of a non-aqueous electrolyte, a second curve Z2 indicates an impedance change caused by attachment of a solution with high conductivity, and a third curve Z3 indicates an impedance change caused by attachment of a solution with low conductivity.

As described above, in a case where a non-aqueous electrolyte is attached to the sensor unit 31, metal is deposited from the first electrode 31A and the second electrode 31B. The impedance gradually changes over time according to an amount of deposited metal. In other words, as indicated by the first curve Z1, the impedance gradually changes.

In a case where a solution with high conductivity is attached to the sensor unit 31, the first electrode 31A and the second electrode 31B are short-circuited to each other. In other words, as indicated by the second curve Z2, the impedance, that is, a voltage rapidly decreases. In a case where a solution with low conductivity is attached to the sensor unit 31, a temporal change of the impedance between the first electrode 31A and the second electrode 31B, that is, a temporal change of a voltage is slight.

As described above, a tendency of an impedance change, that is, a behavior of a voltage change differs depending on an object attached to the sensor unit 31. In other words, it is possible to determine on the basis of a mode of an obtained impedance change, whether the impedance change is an impedance change caused by liquid leakage or an impedance change caused by causes such as dew condensation other than liquid leakage. For example, in a case where impedance is within a predetermined range (that is, a voltage is within a range between a liquid leakage detection upper limit threshold value $V_{LD\_H}$ and a liquid leakage detection lower limit threshold value $V_{LD\_L}$) after a predetermined time elapses from a time point at which the impedance decreases, the liquid leakage determination unit 33 may determine that liquid leakage has occurred. A tendency of an impedance change is determined, and thus it is possible to avoid misrecognition of liquid leakage due to dew condensation or the like.

The impedance between the first electrode 31A and the second electrode 31B may be obtained according to any method. For example, the impedance may be obtained on the basis of a potential difference (voltage difference) between the first electrode 31A and the second electrode 31B, and may be obtained on the basis of an amount of a current flowing therebetween. The liquid leakage detection upper limit threshold value $V_{LD\_H}$ and the liquid leakage detection lower limit threshold value $V_{LD\_L}$ may be calculated on the basis of active energy of metal used for the first electrode 31A and the second electrode 31B, or the threshold values may be set through a test performed in advance.

The first electrode 31A and the second electrode 31B preferably contain at least one metal selected from the group consisting of tin, silver, copper, nickel, zinc, and lead. The electrodes may be made of only one or two or more metals among the metals. Among the metals, the first electrode 31A and the second electrode 31B preferably contain tin. In a case where the first electrode 31A and the second electrode 31B are made of only tin, a speed of metal deposition is high, and the occurrence of liquid leakage can be determined faster. An amount of the metal contained in the electrodes can be optionally selected. The electrodes are preferably subjected to surface treatment, and the metal can be preferably used for the surface treatment. As the most preferable example, for example, surfaces of the electrodes are preferably subjected to surface plating treatment with tin or a solder (an example of the solder is Sn-3.0% Ag-0.5% Cu) having tin as a main component.

Figure 8:
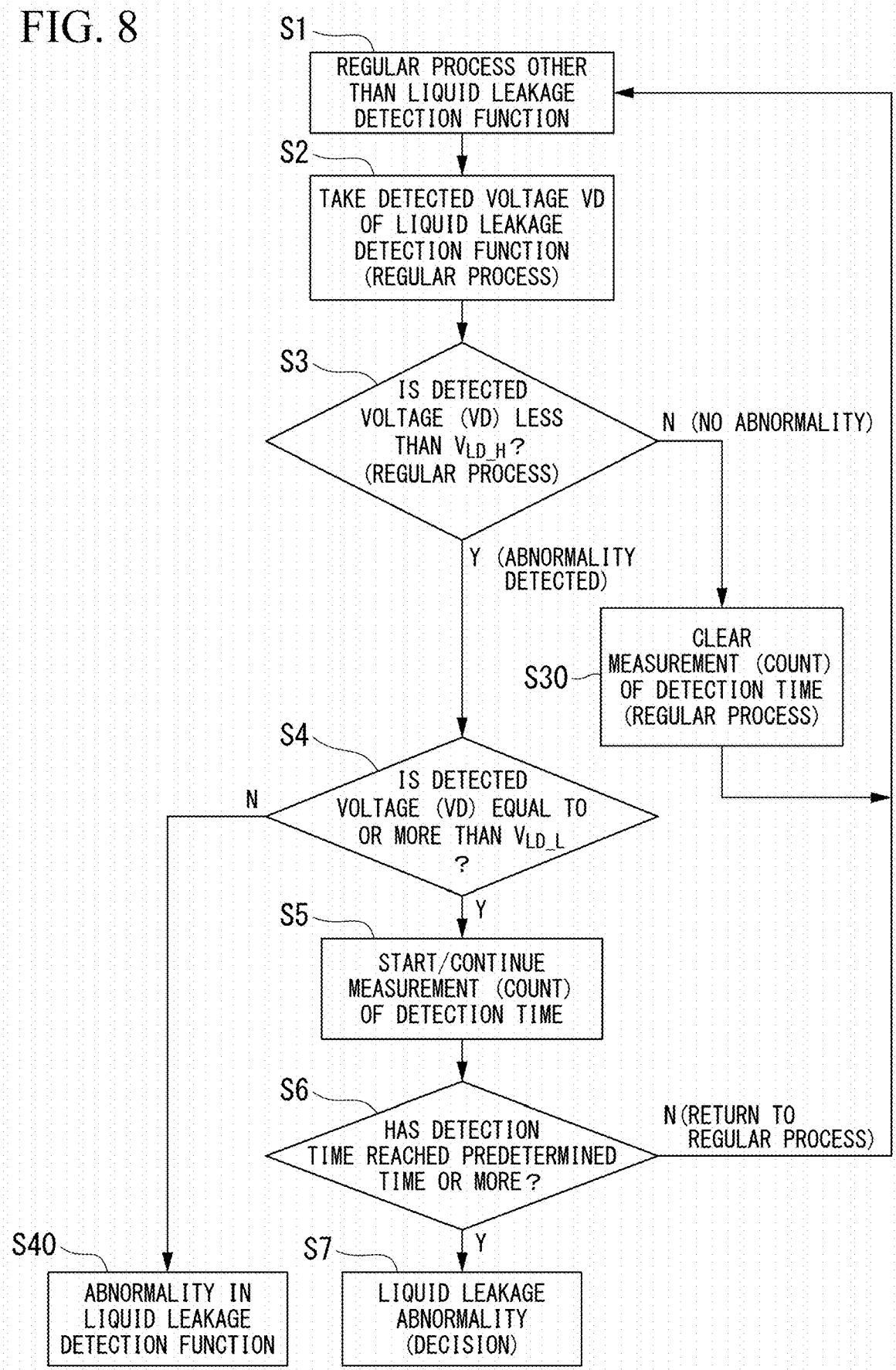
FIG. 8 is a flowchart illustrating a liquid leakage determination in the battery pack according to the present embodiment.

FIG. 8 is a flowchart illustrating an example of liquid leakage determination in the battery pack according to the present embodiment. In the liquid leakage determination, first, the liquid leakage sensor 30 checks that the battery pack 100 performs a regular process (step S1). Next, the sensor unit 31 measures a voltage value and/or impedance between the first electrode 31A and the second electrode 31B when the battery pack 100 performs a regular process, and the impedance may be obtained based on, for example, the voltage value. A voltage $V_D$ measured at this time is input to the liquid leakage determination unit 33 as a reference voltage (step S2).

Next, the sensor unit 31 measures a voltage and/or impedance between the first electrode 31A and the second electrode 31B for each predetermined measurement count. The liquid leakage determination unit 33 determines whether or not the measured voltage is less than the liquid leakage detection upper limit threshold value $V_{LD\_H}$ (step S3). In a case where the measured voltage is equal to or more than the liquid leakage detection upper limit threshold value $V_{LD\_H}$, a regular state is maintained. In this case, measurement count is clear (step S30), and the flow is repeated.

In a case where the measured voltage is less than the liquid leakage detection upper limit threshold value $V_{LD\_H}$, the liquid leakage determination unit 33 determines whether or not the measured voltage is equal to or more than the liquid leakage detection lower limit threshold value $V_{LD\_L}$ (step S4). In a case where the measured voltage is less than the liquid leakage detection lower limit threshold value $V_{LD\_L}$, there is a high probability that short-circuit may occur as indicated by the second curve Z2 (refer to FIG. 7). In other words, abnormality is regarded to occur in the function of the liquid leakage sensor 30, and the flow is stopped (step S40).

On the other hand, in a case where the measured voltage is equal to or more than the liquid leakage detection lower limit threshold value $V_{LD\_L}$, the sensor unit 31 measures a temporal change of impedance (that is, a voltage) (step S5). The liquid leakage determination unit 33 determines whether or not the voltage value is less than the liquid leakage detection upper limit threshold value $V_{LD\_H}$ and is equal to or more than the liquid leakage detection lower limit threshold value $V_{LD\_L}$ even though a detection time reaches a predetermined time or more (step S6). In a case where the condition is not satisfied, there is a probability that an impedance change occurs due to factors other than liquid leakage, and thus the flow returns to step S1. In a case where the condition is satisfied, the liquid leakage determination unit 33 determines that liquid leakage occurs, information is sent to the charging control unit 40 from the liquid leakage determination unit 33, and at least charging of the battery cells 10 is stopped.

(Second Sensor)

Figure 9:
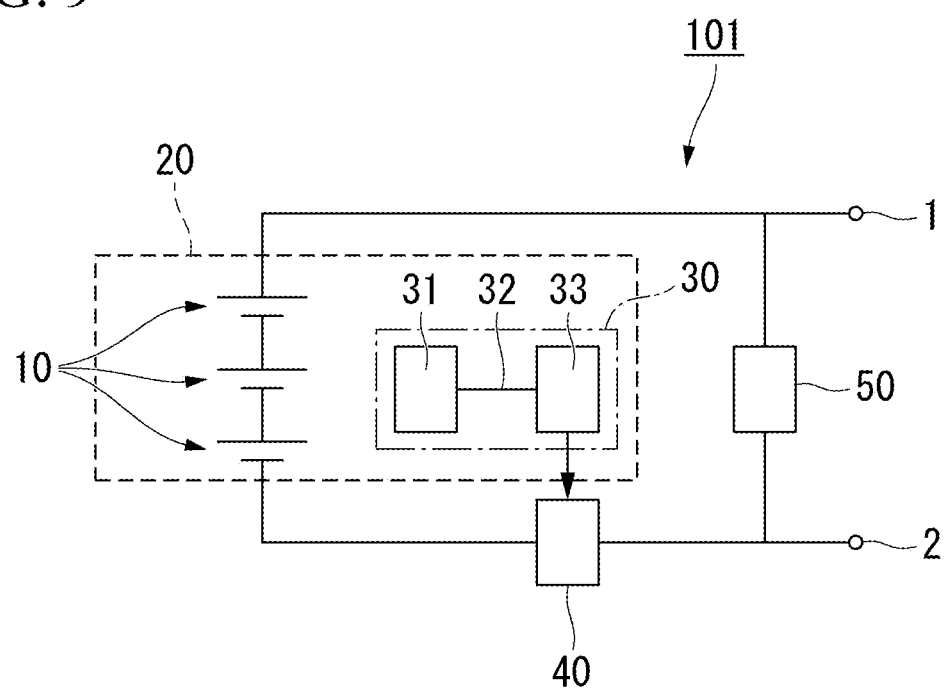
FIG. 9 is a diagram schematically illustrating a circuit structure of another preferable example of a battery pack according to the present embodiment.

FIG. 9 is a diagram schematically illustrating a circuit structure of another example of a battery pack 101 according to the present embodiment. The battery pack 101 illustrated in FIG. 9 further includes a second sensor 50. The second sensor 50 is disposed in parallel to the battery cells 10 with respect to the first terminal 1 and the second terminal 2. The second sensor 50 detects a voltage or current change of the battery cell 10. A state change of the battery cell 10 is detected by the second sensor 50 in addition to the liquid leakage sensor 30, and thus it is possible to further increase liquid leakage detection sensitivity. The battery pack 101 preferably has the second sensor 50 outside the casing 20.

As described above, the battery pack 100 according to the present embodiment observes a phenomenon generated by a leaked electrolyte with the liquid leakage sensor 30, instead of a resistance value (DC impedance) change of the battery cell 10. The battery cell 10 and the liquid leakage sensor 30 are separated from each other in terms of circuit, and thus it is possible to prevent a resistance value (DC impedance) change of the battery cell 10 caused by deterioration or the like in the battery cell 10 from being misrecognized as an impedance change caused by liquid leakage.

The liquid leakage sensor 30 determines whether or not a predetermined impedance change which is caused by attachment of a non-aqueous electrolyte to the sensor unit 31, that is, a voltage change is satisfied, and thus it is possible to differentiate an impedance change caused by short-circuit due to droplets generated by dew condensation from an impedance change caused by liquid leakage.

In a case where a non-aqueous electrolyte contains a lithium salt including fluorine atoms, and the sensor unit 31 is made of tin, it is possible to considerably increase a speed at which the deposition of metal is generate at tin and thus to increase liquid leakage detection sensitivity.

As mentioned above, the present embodiment has been described in detail with reference to the drawings, but the respective configurations and a combination thereof in each embodiment are only examples, and addition, omission, replacement, and change of a configuration may occur within the scope without departing from the concept of the present invention.

EXAMPLES

Example 1

First, eight battery cells packaged with laminate films were stacked in a casing. Liquid leakage was simulated, and an electrolyte was dropped onto an upper surface of an eighth battery cell with a spuit. As the electrolyte, 1 L of an electrolyte prepared by adding a mixture of ethylene carbonate and diethyl carbonate in a volume ratio of 3:7 to 1M of $LiPF_6$ was used.

A drop amount was 0.25 cc that is 3.5% of a total amount of the electrolyte of a single cell. The sensor unit of the electric leakage sensor was provided under the eight battery cells and around the cathode terminal and the anode terminal in the casing. The sensor unit was disposed on an inner surface of the casing. The electrodes of the sensor unit of the liquid leakage sensor were made of tin. A shape of the sensor unit was formed to be similar to the shape illustrated in FIG. 5. After the battery pack was tilted once from a state in which a stacked surface was a lower surface to a state in which a side surface was a lower surface, a voltage applied between the electrodes of the liquid leakage sensor was measured.

Example 2

A drop amount was 0.50 cc. The remaining conditions were the same as in Example 1.

Figure 10:
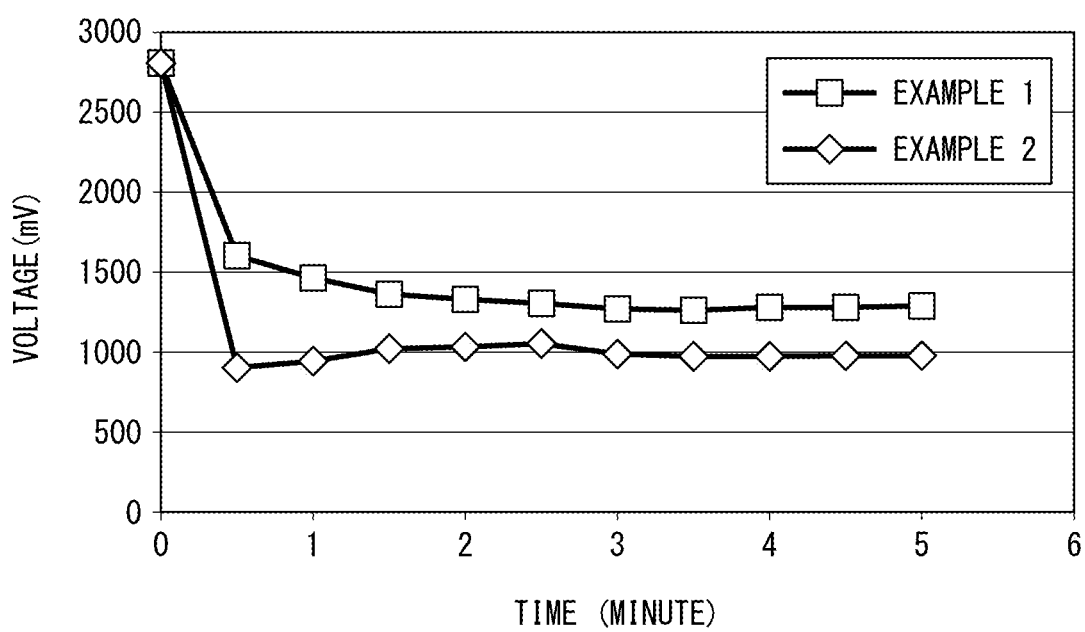
FIG. 10 is a diagram illustrating that temporal changes of voltages which is applied between electrodes of a liquid leakage sensor in Example 1 and Example 2 were checked.

FIG. 10 is a diagram illustrating that temporal changes of voltages applied between electrodes of the liquid leakage sensor in Example 1 and Example 2 were checked. As illustrated in FIG. 10, a voltage between the electrodes gradually changed. In other words, a predetermined impedance change caused by attachment of the non-aqueous electrolyte to the sensor unit could be detected.

INDUSTRIAL APPLICABILITY

According to the present invention, it is possible to provide a battery pack capable of detecting leakage of an electrolyte.

REFERENCE SIGNS LIST

1 FIRST TERMINAL
2 SECOND TERMINAL
10 BATTERY CELL
11 CATHODE TERMINAL
12 ANODE TERMINAL
20 CASING
30 LIQUID LEAKAGE SENSOR
31 SENSOR UNIT
31A FIRST ELECTRODE
31B SECOND ELECTRODE
31C INSULATING SUBSTRATE
32 WIRING PORTION
33 LIQUID LEAKAGE DETERMINATION UNIT
40 CHARGING CONTROL UNIT
50 SECOND SENSOR
100, 100 BATTERY PACK
L LEAKED LIQUID RETENTION REGION
VLD_H LIQUID LEAKAGE DETECTION UPPER LIMIT THRESHOLD VALUE
VLD_L LIQUID LEAKAGE DETECTION LOWER LIMIT THRESHOLD VALUE
Z1 FIRST CURVE
Z2 SECOND CURVE
Z3 THIRD CURVE

The invention claimed is:

1. A battery pack, comprising:
a battery cell which contains a non-aqueous electrolyte, wherein the battery cell is a non-aqueous electrolyte secondary battery;
a casing which stores the battery cell; and
at least one liquid leakage sensor which detects liquid leakage from the battery cell,
wherein one or both of the casing and the battery cell have a leaked liquid retention region in which the non-aqueous electrolyte tends to be retained when the non-aqueous electrolyte leaks out of the battery cell,
wherein the liquid leakage sensor outputs measurement information as a detection result without using a charging/discharging circuit which charges and discharges the battery cell, and
wherein at least one sensor unit of the liquid leakage sensor is provided in the leaked liquid retention region, the sensor unit contains at least one metal selected from the group consisting of tin, silver, copper, nickel, zinc, and lead, and
the sensor unit includes at least a first electrode and a second electrode which is insulated and disposed with a predetermined gap from the first electrode.

2. The battery pack according to claim 1,
wherein the liquid leakage sensor detects an impedance change caused by attachment of the non-aqueous electrolyte to the sensor unit.

3. The battery pack according to claim 2,
wherein the liquid leakage sensor includes a liquid leakage determination unit which determines whether or not liquid leakage occurs on the basis of a tendency of the impedance change.

4. The battery pack according to claim 1, further comprising:
a second sensor which detects a voltage or current change of the battery cell.

5. The battery pack according to claim 1,
wherein the non-aqueous electrolyte contains an organic carbonate solvent.

6. The battery pack according to claim 1,
wherein the non-aqueous electrolyte contains a lithium salt including a fluorine atom.

7. The battery pack according to claim 1,
wherein the non-aqueous electrolyte second battery is a lithium ion secondary battery.

8. The battery pack according to claim 1,
wherein the liquid leakage sensor includes the sensor unit, a wiring portion extending from the sensor unit, and a liquid leakage determination unit coupled to the wiring portion, and
wherein the wiring portion is not coupled to the charging/discharging circuit of the battery cell.

9. The battery pack according to claim 1, further comprising the charging/discharging circuit,
wherein a part of the charging/discharging circuit is included in the casing, and a remaining portion of the charging/discharging circuit is provided outside the casing.

10. The battery pack according to claim 9,
wherein the part of the charging/discharging circuit included in the casing is not coupled to the liquid leakage sensor in the casing.

11. The battery pack according to claim 1,
wherein the liquid leakage sensor is disposed inside the casing.

12. The battery pack according to claim 1,
wherein the liquid leakage sensor is disposed outside the casing.

13. A battery pack, comprising:
a battery cell which contains a non-aqueous electrolyte, wherein the battery cell is a non-aqueous electrolyte secondary battery;
a casing which stores the battery cell; and
at least one liquid leakage sensor which detects liquid leakage from the battery cell,
wherein one or both of the casing and the battery cell have a leaked liquid retention region in which the non-aqueous electrolyte tends to be retained when the non-aqueous electrolyte leaks out of the battery cell,
wherein the liquid leakage sensor outputs measurement information as a detection result without using a charging/discharging circuit which charges and discharges the battery cell, and
wherein at least one sensor unit of the liquid leakage sensor is provided in the leaked liquid retention region, the sensor unit includes at least a first electrode and a second electrode which is insulated and disposed with a predetermined gap from the first electrode, and
the liquid leakage sensor detects an impedance change caused by metal which is deposited from the first electrode and the second electrode due to attachment of the non-aqueous electrolyte to the first electrode and the second electrode of the sensor unit.

14. The battery pack according to claim 13,
wherein the liquid leakage sensor includes the sensor unit, a wiring portion extending from the sensor unit, and a liquid leakage determination unit coupled to the wiring portion, and
wherein the wiring portion is not coupled to the charging/discharging circuit of the battery cell.

15. The battery pack according to claim 13,
wherein the liquid leakage sensor is disposed inside the casing.

16. The battery pack according to claim 13,
wherein the liquid leakage sensor is disposed outside the casing.

17. A battery pack, comprising:
a battery cell which contains a non-aqueous electrolyte, wherein the battery cell is a non-aqueous electrolyte secondary battery;
a casing which stores the battery cell; and
at least one liquid leakage sensor which detects liquid leakage from the battery cell,
wherein one or both of the casing and the battery cell have a leaked liquid retention region in which the non-aqueous electrolyte tends to be retained when the non-aqueous electrolyte leaks out of the battery cell,
wherein the liquid leakage sensor outputs measurement information as a detection result without using a charging/discharging circuit which charges and discharges the battery cell,
wherein at least one sensor unit of the liquid leakage sensor is provided in the leaked liquid retention region, and
wherein all inner surfaces of the casing are flat.

18. The battery pack according to claim 17,
wherein the inner surfaces consist of three pairs of inner flat surfaces which are arranged in parallel with each other.

19. The battery pack according to claim 17,
wherein the liquid leakage sensor includes the sensor unit, a wiring portion extending from the sensor unit, and a liquid leakage determination unit coupled to the wiring portion, and
wherein the wiring portion is not coupled to the charging/discharging circuit of the battery cell.

20. The battery pack according to claim 17,
wherein the liquid leakage sensor is disposed outside or inside the casing.

* * * * *